United States Patent [19]

Compton et al.

[11] Patent Number: 4,867,020

[45] Date of Patent: * Sep. 19, 1989

[54] APPARATUS FOR FINISHING PISTONS AND THE LIKE AND METHOD THEREFOR

[75] Inventors: Ronald E. Compton, Southfield; Bruce A. Brown, Rochester Hills; Donald S. Akhurst, Centerline; Douglas R. Myers, Utica; Robert W. Smith, Holly; Robert W. DeBruyne, Warren, all of Mich.

[73] Assignee: The Cross Company, Fraser, Mich.

[*] Notice: The portion of the term of this patent subsequent to Apr. 26, 2005 has been disclaimed.

[21] Appl. No.: 145,047

[22] Filed: Jan. 19, 1988

Related U.S. Application Data

[62] Division of Ser. No. 925,438, Oct. 31, 1986, Pat. No. 4,739,684.

[51] Int. Cl.⁴ ............................................. B23P 23/02
[52] U.S. Cl. ...................................... 82/1.11; 82/114; 82/124; 29/27 R; 29/564
[58] Field of Search ...................... 29/564, 27 R, 27 A, 29/27 C, 26 R, 26 A, 52, 56, 39, 156, 558; 82/1 C, 2 B, 2 A, 2 C, 2.5, 24; 408/26; 409/165, 166, 199; 72/443; 51/289 R, 101 R, 290, 227, 121

[56] References Cited

U.S. PATENT DOCUMENTS

| | | | |
|---|---|---|---|
| 1,472,295 | 10/1923 | Donnelly | 51/289 R |
| 3,540,327 | 11/1970 | Mehr | 82/2 |
| 3,685,915 | 8/1975 | Vierstraete | 408/26 |
| 3,990,133 | 11/1976 | Schalles | 82/2.5 |
| 4,057,893 | 11/1977 | Smith | 82/2 B |
| 4,180,894 | 1/1980 | Link | 29/27 C |
| 4,203,062 | 5/1980 | Bathen | 82/24 R |
| 4,312,154 | 1/1982 | Fournier | 51/101 R |
| 4,570,813 | 2/1986 | Holmstrom | 29/26 A |
| 4,635,340 | 1/1987 | Link | 82/18 |
| 4,653,360 | 3/1987 | Compton | 82/2 B |
| 4,683,787 | 8/1987 | Link | 82/18 |
| 4,739,684 | 4/1988 | Brown et al. | 82/1 C |

FOREIGN PATENT DOCUMENTS

| | | |
|---|---|---|
| 2033026 | 9/1974 | Fed. Rep. of Germany . |
| 3511614 | 3/1985 | Fed. Rep. of Germany . |
| 0205095 | 12/1983 | German Democratic Rep. ... 82/1 C |
| 310921 | 4/1930 | United Kingdom ............ 51/289 R |

Primary Examiner—Robert P. Olszewski
Assistant Examiner—Blynn Shideler
Attorney, Agent, or Firm—David R. Syrowik; Raymond J. Eifler

[57] ABSTRACT

A method and apparatus for finishing pistons (10) and the like from foundry-turned castings during one clamping operation to provide enhanced manufacturing productivity. Separate boring and turning modules (34, 24) of the apparatus are mounted on a primary base (18) and a grooving module (54) is mounted on a secondary base (72). The modules automatically groove the ring grooves (11), turn the complex shape of the skirt (15) and bore the wrist pin bore (13) through an ordered sequence of manufacturing steps. The piston stock is mounted for rotation on headstock and tailstock assemblies (82, 84). These assemblies are carried on the secondary base (72) which is slidably mounted on the primary base for movement into operative position with respect to the boring and turning modules according to the ordered sequence. The method and system improve piston quality while reducing manufacturing costs including saving factory floor space.

11 Claims, 5 Drawing Sheets

APPARATUS FOR FINISHING PISTONS AND THE LIKE AND METHOD THEREFOR

This is a continuation of co-pending application Ser. No. 925,438, filed on Oct. 31, 1986 now U.S. Pat. No. 4,739,684.

This invention relates to related application U.S. patent application Ser. No. 731,419 filed May 7, 1985, now U.S. Pat. No. 4,653,360 and relates to a method and an apparatus for finishing pistons and the like and, in particular, to method and apparatus for finishing pistons and the like during a single clamping operation.

The manufacture of a complex part, such as a piston, requires many different metal removal operations, each of which must be performed with precision to meet close tolerances. In conventional manufacturing processes, these operations are performed on different machine tools. Many apparatus require careful adjustments and setups of the apparatus and the work, thereby necessitating the expenditure of cost in man hours and non-productive time. Another limiting factor is the accuracy at which such multiple machining operations can be performed on a piece of stock due to problems in repeatability. For example, problems in repeatability often result from interference caused by chips and other machining debris generating during the course of machining.

The prior art discloses a spindle lathe including a pair of slide units mounted on a slide bed. One of the slide units carries a toolholder for holding a plurality of tools for machining stock and the other slide unit supports a reinforcing head having backup rollers which frictionally engage the rotating stock and rotate with the stock to prevent deformation of the stock during machining. A boring apparatus is arranged to longitudinally bore the ends of the stock while the stock is secured in its machining position. The U.S. Pat. No. 3,540,327 entitled "Spindle-Less Lathe" and issued Nov. 17, 1970 discloses an example of such a lathe.

One prior art piston finishing machine automatically turns and chamfers the ring grooves in the piston, turns the complex shape of the skirt of the piston and bores the wrist pin hole in the piston. All these functions are performed under programmable control and in one clamping of the piston. One advantage of such a machine is to improve piston quality by holding all dimensional relationships rigidly uniform and in orthogonality. During the machine cycle, a transfer bar engages and maintains orientation of the piston. The finishing machine is arranged with two stations, each with either two or three heads to finish pistons four or six at a time, respectively.

Despite the advances of the prior art, there is still a need of maintaining extremely close tolerances while operating in a normal shop atmosphere to finish parts at relatively high speeds. Furthermore, as production requirements change, there is a need for a completely self-contained machine which can be relatively easily moved from one location to another, thereby providing production flexibility.

SUMMARY OF THE INVENTION

One advantage of the present invention is to provide an improved method and apparatus for finishing pistons and the like wherein piston quality is improved while reducing manufacturing costs, including saving factory floor space.

Another advantage of the present invention is to provide an improved method and apparatus for finishing pistons and the like wherein the pistons are finished at relatively high production rates while retaining relatively close tolerances.

Yet still another advantage of the present invention is to provide an improved method and apparatus for finishing pistons and the like wherein the apparatus comprises a self-contained machine for providing a variety of machining steps on the piston and wherein the machine is relatively easily movable from one location to another.

The piston finishing apparatus of the present invention includes a secondary base supported for movement on a primary base. A grooving module and headstock and tailstock assemblies are mounted on the secondary base. An actuator means moves the secondary base relative to the primary base so that a piston held between the tailstock and headstock assemblies moves from a load station on the base to the turning and boring stations.

Preferably, the actuator means is adapted to reciprocate the secondary base between the stations along a horizontal axis about which the piston rotates, and the piston is positioned along the horizontal axis during boring, grooving and turning thereof.

Also, preferably, a latch mechanism is provided for locking the headstock and tailstock assemblies in a predetermined angular position about the horizontal axis when the piston is not rotating to assure radial tolerance of the wrist pin hole to the complex shape of the skirt.

The piston finishing method of the present invention includes the steps of moving the clamped piston along the horizontal axis both to and away from a boring station for boring of the wrist pin hole. The piston is further moved along the horizontal axis both to and away from a turning station for turning at least the skirt of the piston.

Preferably, the method also includes the step of maintaining the piston along the horizontal axis during the steps of boring, turning and grooving.

Additional advantages accruing to the above method and apparatus are numerous. For example, the apparatus is capable of producing exceptional part finish at relatively high speeds. Also, the apparatus is capable of maintaining very close tolerances while operating in a normal shop environment. The apparatus is self-contained and, consequently, is relatively easy to move from one location to another as production requirements change.

The above advantages and other features of the present invention are readily apparent from the following detailed description when taken in connection with the accompanying drawings.

DETAILED DESCRIPTION OF THE INVENTION

Figure 1:
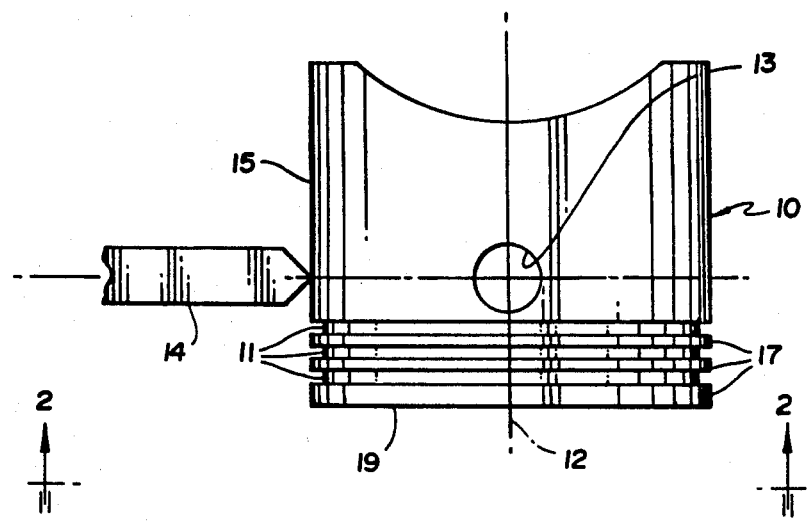
FIG. 1 is a side elevational view, partially broken away, of a workpiece, such as a piston, and the tip of a cutting tool.

Referring to FIG. 1, there is illustrated a single piece of stock, such as a foundry-turned casting or piston generally indicated at 10, which is finished by utilizing the method and apparatus of the present invention. By "finishing" it is meant that ring grooves 11 are grooved or turned in the piston 10, a wrist pin bore 13 is bored in the piston 10 and the complex shape of the skirt 15 of the piston 10 is turned with both rough and finish operations, as appropriate, to produce a part meeting blueprint specifications. Ringlands 17 are formed between the ring grooves 11 and between the lowermost ring groove 11 and the dome 19 of the piston 10.

Figure 2:
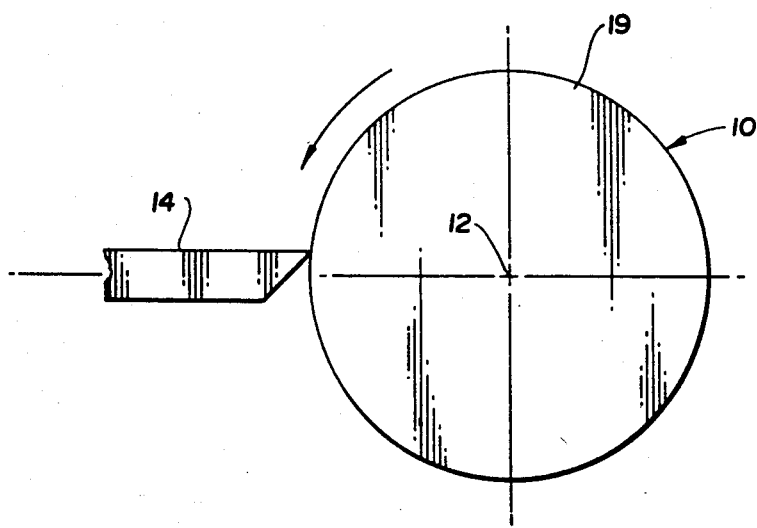
FIG. 2 is a sectional view, taken along line 2—2 in FIG. 1.

As shown in FIG. 2, the piston 10 is rotated about an axis 12 and is positioned relative to the tip of a cutting or turning tool 14 in order to turn the complex shape of the piston skirt.

APPARATUS

Figure 3:
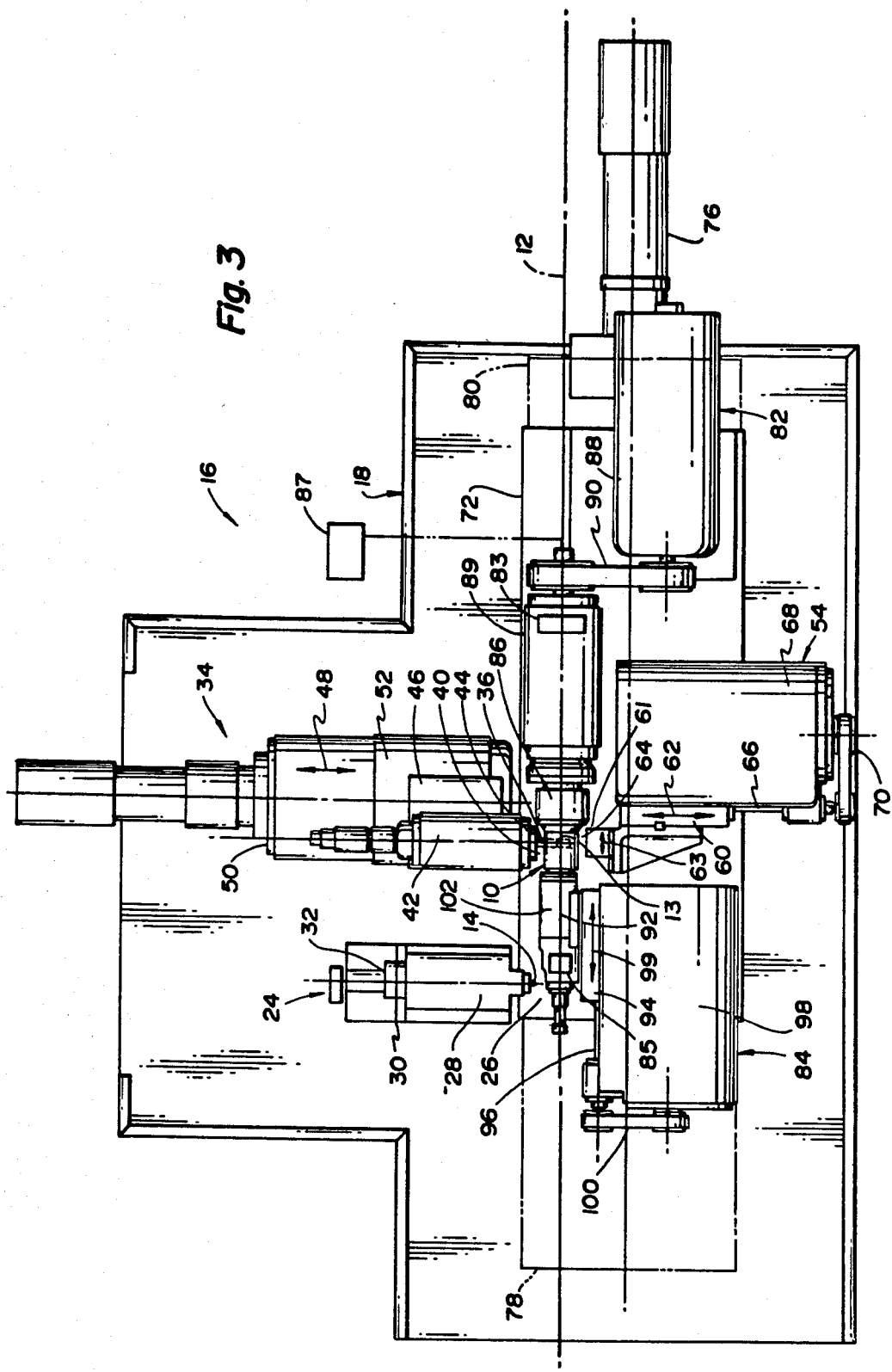
FIG. 3 is a top plan view of apparatus constructed in accordance with the present invention with a secondary base of the apparatus illustrated in two extreme positions relative to a primary base by phantom lines.
Figure 4:
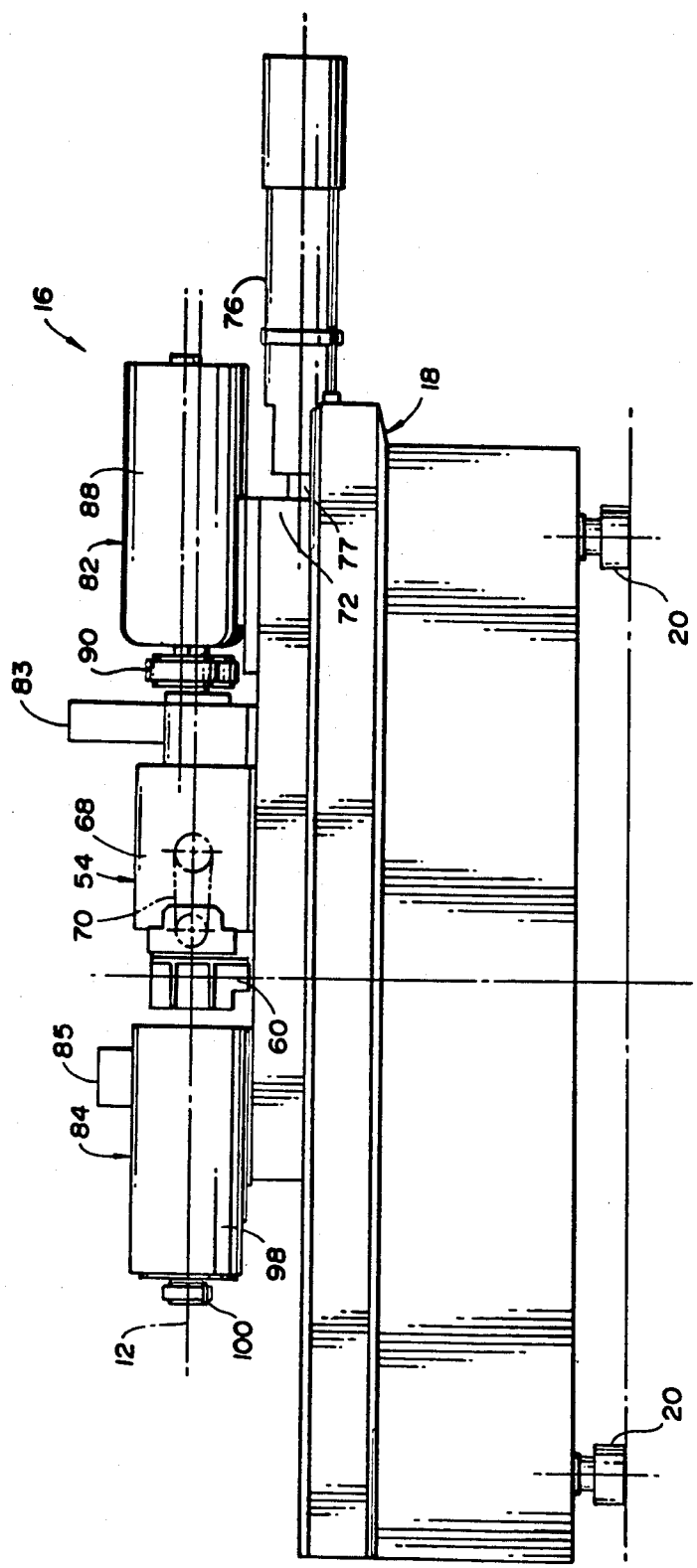
FIG. 4 is a side-elevational view of the apparatus of FIG. 3.
Figure 5:
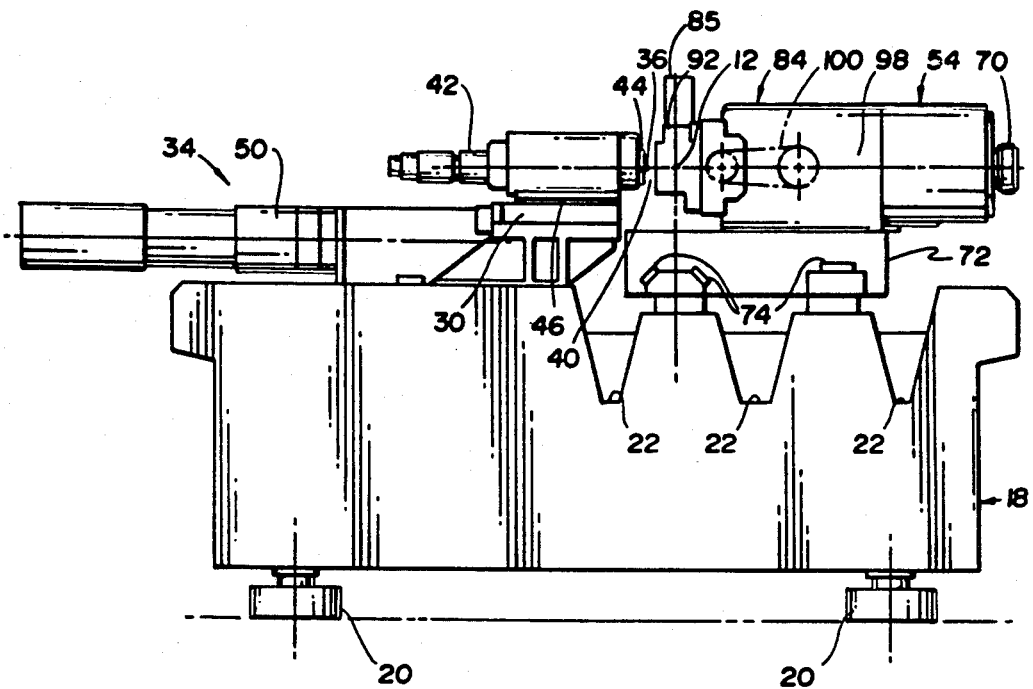
FIG. 5 is an end view of the apparatus of FIG. 3 with the turning module, except for its base, removed.

Referring now to FIGS. 3 through 5, there is illustrated a machine or apparatus, generally indicated at 16, constructed in accordance with the present invention for finishing pistons and the like, such as the piston 10. The apparatus 16 includes a composite granite-like or cast iron primary base, generally indicated at 18, mounted on levelers or feet 20 for leveling the base 18. The primary base 18 dampens the apparatus 16 and provides thermal stability. As best shown in FIG. 5, the base 18 includes built-in chip and coolant troughs 22 which allow chips and coolant to exit from one end of the base 18.

Referring to FIG. 3, a turning module, generally indicated at 24, is mounted on the primary base 18. The turning module 24 includes a turning or cutting tool 14 for turning the skirt of the piston 10 at a turning station 26. The cutting tool 14 is mounted on a carriage 28 which is slidably driven with respect to a base member 30 by a linear motor or slide drive 32. Alternatively, the drive could be hydraulic. The carriage 28 is capable of being driven between a turning home position, a turning semi-finish position and a turning finish position by the linear motor 32. The turning module 24 adds the capability of CNC complex turning of the piston 10.

Also mounted on the primary base 18 is a boring module, generally indicated at 34. The boring module 34 includes a boring tool 36 for boring the wrist pin bore 13 in the piston 10, as illustrated by phantom lines. The wrist pin bore 13 may be straight or tapered and is bored by the boring tool 36 when the piston 10 is located at a boring station 40.

A drive motor 42 drives the boring tool 36 through a boring spindle 44. By tipping the spindle 44, an eliptical hole can be provided. The boring motor and its spindle 44 are mounted on a slide 46 for sliding movement in a selected one of the directions indicated by arrows 48. The boring slide 46 is slidably supported by bearings (not shown) on a base member 52. The slide 46 is driven by a ball screw (not shown) which, in turn, is driven by a brushless servo motor 50. Alternatively, the drive can be hydraulic. The boring slide 46 is capable of movement between a boring home position and one or more boring work positions in order to bore the wrist pin bore 13 in the piston 10. Also, the vertical position of the boring spindle 44 is preferably adjustable.

A grooving module, generally indicated at 54, is mounted on a secondary base or main slide 72 which, in turn, is slidably mounted on the primary base 18 by roller bearings 74 as best shown in FIG. 5. The secondary base 72 is driven by an actuator means or mechanism comprising a brushless servo 76 which drives a ball screw 77 to slidably move the secondary base 72 between first and second extreme positions 78 and 80, as indicated by phantom lines in FIG. 3.

The apparatus 16 also includes a headstock assembly, generally indicated at 82 and a tailstock assembly, generally indicated at 84, both of which are mounted on the secondary base 72 to move therewith. The headstock and tailstock assemblies 82 and 84 cooperate to hold the piston 10 and rotate it about the horizontal axis 12. Also, the headstock and tailstock assemblies 82 and 84 maintain rotation of the piston 10 along the horizontal axis 12 throughout the entire range of movement of the secondary base 72 (i.e. between the extreme positions 78 and 80).

The headstock assembly 82 includes a conventional chuck 86 and a spindle 89 which is caused to rotate in a conventional fashion by a brushless servo or drive motor 88 through a belt-and-pulley transmission 90.

The tailstock assembly 84 includes a tailstock or spindle member 92 which is mounted on a tailstock slide 94. The spindle member 92 cooperates with the spindle 89 to rotate the piston 10 therebetween in a conventional fashion.

A latch means for mechanism comprising a headstock latch 83 and a tailstock latch 85 is provided to assure radial tolerance of the wrist pin hole 13 to the complex shape of the skirt 15. The headstock latch 83 is pneumatically controlled to move a locking member (not shown) against a flattened portion of the spindle 89. The tailstock latch 85 is also pneumatically controlled to move a key (not shown) in a key way (not shown) formed in the spindle member 92. These locking features also provide the proper orientation of the assemblies 82 and 84 for the loading and unloading of pistons. The angular position of the spindle 89 is provided by an encoder 87 coupled thereto for use by a control system (not shown).

The tailstock slide 94 is mounted on a ball screw 96 to alternately move in a desired one of the two directions indicated by arrows 99 upon rotation of the ball screw 96. The ball screw 96 is driven by a brushless servo or drive motor 98 through a belt-and-pulley transmission 100 in a conventional fashion. The servo 98 as well as the other previously identified motors are adapted to operate under full CNC control. Alternatively, the drive could comprise a hydraulic drive.

Figure 6:
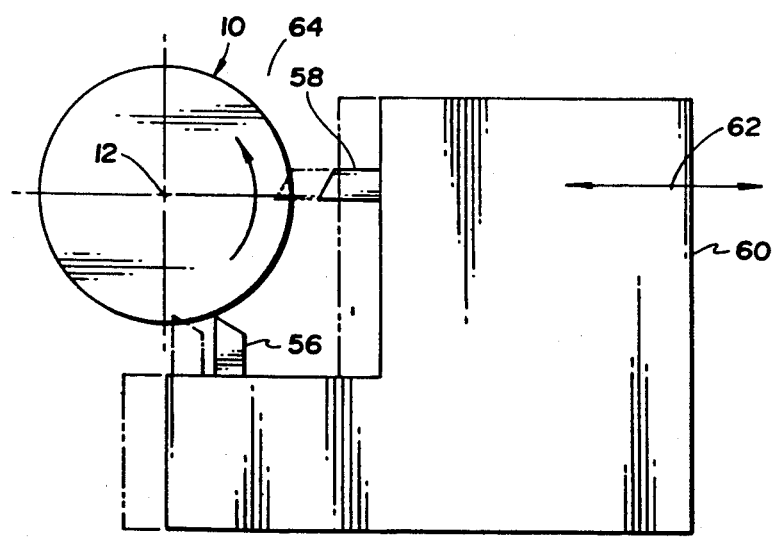
FIG. 6 is an end view illustrating two positions of a pair of grooving tools mounted on a common groove slide.

The grooving module 54 includes a pair of grooving tools 56 and 58, as illustrated in FIG. 6. The grooving tool 56 roughs or skives the ring grooves from below the piston 10 and the grooving tool 58 finishes or plunges the ring grooves of the piston 10 laterally. Both of the grooving tools 56 and 58 are mounted on a groove slide 61 for sliding movement in a selected one of the directions indicated by arrows 63. In turn, the groove slide 61 is mounted on a second groove slide 60 for sliding movement in a selected one of the directions indicated by arrows 62. In this way, the grooving tools 56 and 58 can groove the piston 10 at a location 64 to provide tapered grooves through synchronized movement of the slides 60 and 61.

The groove slide 60 is slidably driven by a ball screw 66 which, in turn, is driven by a brushless servo or drive motor 68 through a belt-and-pulley transmission 70. Alternatively, a hydraulic drive could be provided together with a slide mounted encoder. The groove slide 60 is slidably supported by bearings (not shown) on the drive motor 68. The groove slide 61 is slidably driven in a similar fashion.

Figure 7:
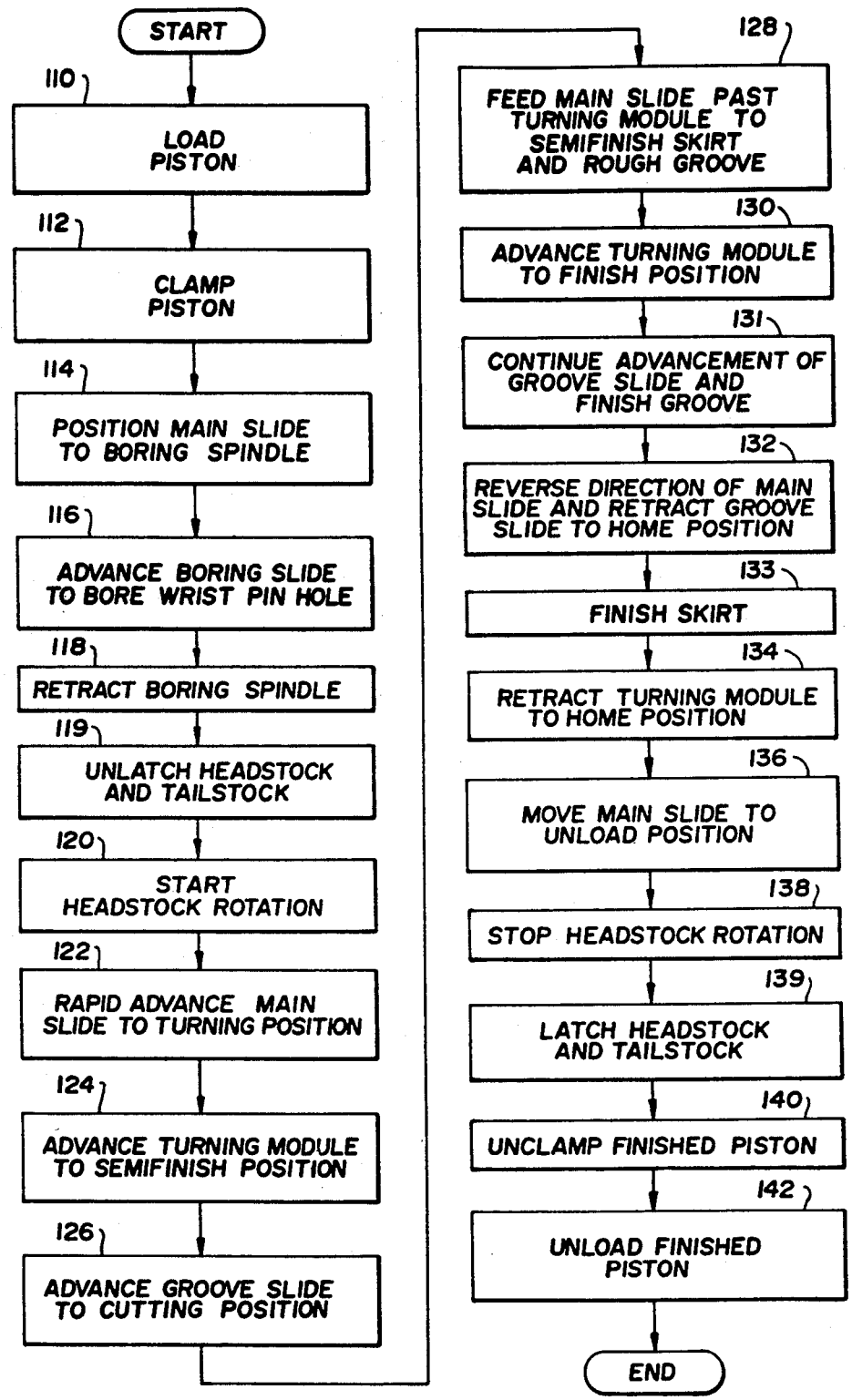
FIG. 7 is a flowchart illustrating the various operating steps taken by the apparatus of FIGS. 3 through 6 to finish the piston.

Referring now to FIG. 7, there is illustrated in flowchart form the steps taken in performing the method of the present invention as embodied in the operation of the apparatus 16.

OPERATION

In step 110, a qualified workpiece, such as the piston 10, is automatically loaded into the apparatus 16 at a load station 102, as shown in FIG. 3, by an automatic loading mechanism which maintains proper wrist pin radial orientation to assure proper machining of the piston 10.

In step 112, the piston 10 is clamped between the chuck 86 and the spindle member 92 upon rotation of the ball screw 96.

In step 114, the main slide or secondary base 72 is slidably moved until the piston 10 is positioned properly at the boring station 40.

In step 116, the boring slide 46 then moves from its boring home position to its boring work position to bore the pin bore 13 in the piston 10.

In step 118, the boring slide 46 is then retracted to its home position.

In step 119, the headstock and tailstock latches 83 and 85, respectively, which were previously latched, are unlatched.

In step 120, the piston 10 is rotated between the spindle member 92 and the chuck 86 about the horizontal axis 12.

In step 122, the main slide 72 is rapidly advanced to the turning station 26 along the horizontal axis 12 by the action of the motor 76 through the ball screw 77.

In step 124, the linear motor 32 causes the carriage 28 to advance the turning tool 26 to its semi-finish position.

In step 128, the rough grooving of the piston 10 is performed by the grooving tool 56 after advancing the groove slide 60, as shown by step 126. This is done at substantially the same time as the semi-finishing is done, as also shown by step 128. After completion of the semi-finish of the skirt of the piston 10 and the completion of the rough groove, the secondary base 72 moves the piston 10 out of the station 26.

In step 130, the turning module 24 then advances to its finish position.

In step 131, the finish grooving tool 58 finish grooves the piston 10.

In step 132, the secondary base 72 reverses its movement to move the piston 10 back into the station 26, while the groove slide 60 is moved to its home position.

In step 133, the skirt is finished. In addition the piston 10 may be unclamped by retracting jaws (not shown) of the chuck 86 so that the ringlands 17 of the piston 10 may be finish turned.

In step 134, the turning module 24 moves back to its home position.

In step 136, the secondary base 72 moves to an unload position and the headstock assembly 82 stops rotation of the piston 10, as indicated in step 138.

In step 139, the latch mechanism is again latched.

In step 140, the piston 10 is unclamped, if previously clamped, through reverse rotation of the ball screw 96 to move the spindle member 92 away from the chuck 86.

In step 142, the piston 10 is automatically unloaded in the same fashion as it was loaded.

The apparatus 16 is intended to work in conjunction with a piston inspection module (not shown) which may be located adjacent to the apparatus 16. The inspection module checks the piston's outer diameter, the wrist pin bore size and automatically feeds the data back to a control system (not shown) of the apparatus 16.

The method and apparatus of the present invention provide numerous advantages. For example, the relationship between the skirt 15 of the piston 10, the pin bore 13 in the piston 10 and the ring grooves 11 are held relatively constant, thereby minimizing tolerance buildup. Also, the apparatus 16 takes up little floor space and is easily moved from one location to another as production requirements change. Also, the various turning, boring and grooving modules 24, 34 and 54, respectively, may be added or subtracted or assume different positions on the primary base 18 or the secondary base 72 for added flexibility. The primary base 18 as well as the secondary base 72 provide good damping characteristics and thermal stability while the piston 10 is being machined and also while the piston 10 is being moved between the various turning and boring stations along the horizontal axis 12. Also, due to the limited range of piston movement along the horizontal axis 12, the cycle time is minimized.

We claim:

1. Apparatus (16) for automatically finishing pistons (10) and the like, said apparatus comprising a primary base (18); a turning module (24) including a turning tool (14) located at a turning station (26) for movement to and from a turning home position, said turning tool being adapted to turn at least the skirt (15) of a piston (10); a secondary base (72) supported for movement on said primary base; one of said primary and secondary bases being adapted to receive and retain a grooving module (54) including at least one grooving tool (56 and 58) mounted at a grooving station for movement to and from a grooving home position; said grooving tool being adapted to groove the piston; a tailstock assembly (84); a headstock assembly (82); said tailstock and headstock assemblies cooperating to clamp the piston and to rotate the piston about a horizontal axis and (12) for work by said grooving and turning tools; and, actuator means (76, 77) for moving said secondary base relative to the primary base; said apparatus being characterized by said tailstock and headstock assemblies (84) being mounted on one of said primary and secondary bases and said turning module being mounted on the other of said primary and secondary bases wherein said actuator means (76, 77) linearly moves said secondary base in a direction parallel to the horizontal axis so that a piston between the tailstock and headstock assemblies is positioned in said turning station and wherein the piston is maintained along the horizontal axis during said relative linear movement and during turning thereof and wherein the turning module further includes a carriage and a linear motor for linearly driving the carriage, the cutting tool being mounted on the carriage for linear movement therewith to and from the turning home position substantially transverse the horizontal axis and wherein the apparatus further comprises latch means (83 and 85) for locking said tailstock and headstock assemblies (84,82) in a predetermined radial position about the horizontal axis (12) when the piston (10) is not rotating to assure radial tolerance of a wrist pin hole (13) in the piston (10) to the shape of the skirt (15) of the piston (10) and for unlocking the tailstock and headstock assemblies (84,82) to permit rotation of the piston (10).

2. The apparatus as claimed in claim 1 wherein the actuator means is adapted to reciprocate the secondary base.

3. The apparatus as claimed in claim 2 wherein said turning and grooving modules are mounted on opposite sides of the horizontal axis and wherein the turning tool is also adapted to turn the ringlands portion of the piston.

4. The apparatus as claimed in claim 1 wherein said grooving module further includes a second grooving tool (58 or 56) mounted for movement between a second grooving home position and a grooving rough position.

5. The apparatus as claimed in claim 4 wherein said first and second grooving tools are mounted on at least one traversing slide (61) for sliding movement therewith.

6. The apparatus as claimed in claim 5 including a second traversing slide (60) mounted on the one traversing slide for sliding movement relative thereto.

7. A method for finishing pistons and the like in a finishing apparatus having a primary base (18), a secondary base (72) supported for linear movement on the primary base and a turning module on one of the primary base and the secondary base, the turning module having a turning tool adapted to turn the piston, said method comprising the steps of: clamping (112) an unfinished piston (10) at a load station (102) along a horizontal axis (12) on the other of the primary base and the secondary base; and rotating (112) the clamped piston about the horizontal axis, said method being characterized by the steps of:

moving (122, 123) the secondary base linearly on the primary base so that the piston is located in a turning station (26);

moving the turning tool linearly to and from a turning home position substantially transverse the horizontal home position substantially transverse the horizontal axis for turning (124, 128, 130, 133, 134) at least a skirt portion (15) of the rotating piston in the turning station;

maintaining the rotary piston along the horizontal axis during turning;

locking the tailstock and headstock assemblies (84, 82) in a predetermined radial position about the horizontal axis (12) when the piston (10) is not rotating to assure radial tolerance of a wrist pin hole (13) in the piston (10) to the shape of the skirt (15) of the piston (10); and unlocking the tailstock and headstock assemblies (84, 82) to permit rotation of the piston (10).

8. The method as claimed in claim 7 including the steps of first semi-finishing (128) the rotating piston and then finishing (133) the rotating piston.

9. The method as claimed in claim 8 including the steps of moving the clamped piston linearly along the horizontal axis relative to the turning station in a first direction after the step of semi-finishing and then moving (132) the clamped piston linearly along the horizontal axis in a second direction opposite the first direction relative to the turning station to finish the clamped piston.

10. The method as claimed in claim 7 or claim 8 or claim 9 further comprising the step of first rough grooving (128) the rotating piston and then finish grooving (131) the rotating piston.

11. A method for finishing piston and the like in a finishing apparatus having a primary base (18) a secondary base (72) supported for linear movement thereon and a turning module on one of the primary base and the secondary base, the turning module having a turning tool adapted to turn the piston, said method comprising the steps of: clamping (112) an unfinished piston (10) at a load station (102) along a horizontal axis (12) on the other of the primary base and the secondary base; rotating (120) the clamped piston about the horizontal axis; grooving (131, 132) the rotating piston until the piston is finish-grooved; stopping (138) rotation of the piston; unclamping (140) the piston; said method being characterized by the steps of:

moving (128, 132) the secondary base linearly on the primary base so that the piston is located in a turning station;

moving the turning tool linearly to and from a turning home position substantially transverse the horizontal axis for turning (124, 128, 130, 133, 134) at least a portion (15) of the rotating piston in the turning station;

maintaining the rotating piston along the horizontal axis during turning thereof locking the tailstock and headstock assemblies (84, 82) in a predetermined radial position about the horizontal axis (12) when the piston (10) is not rotating; and unlocking the tailstock and headstock assemblies (84, 82) to permit rotation of the piston (10).

* * * * *